United States Patent [19]
Stewart

[11] Patent Number: 5,653,275
[45] Date of Patent: Aug. 5, 1997

[54] PLANING CUTTERHEAD GEOMETRY FOR OPTIMIZING WOOD SURFACING

[76] Inventor: John S. Stewart, 6921 Charnel La., Climax, N.C. 27233

[21] Appl. No.: 559,021

[22] Filed: Nov. 16, 1995

[51] Int. Cl.$^6$ .............................. B27L 11/00; B27C 1/00
[52] U.S. Cl. .................... 144/373; 144/117.1; 144/230
[58] Field of Search .......................... 144/114.1, 117.1, 144/116, 218, 230, 329, 369, 373

[56] References Cited

U.S. PATENT DOCUMENTS

| D. 239,317 | 3/1976 | Spencer et al. |
| 4,074,737 | 2/1978 | Stewart . |

*Primary Examiner*—W. Donald Bray
*Attorney, Agent, or Firm*—Rhodes Coats & Bennett, L.L.P.

[57] ABSTRACT

A method of planing a variety of widths of workpieces includes transporting workpieces through a machining area having a rotating cutterhead that includes a series of helically mounted cutting blades spaced circumferentially on the cutterhead and positioned such that one cutting blade engages the workpiece simultaneously as another cutting blade disengages the workpiece, the transporting step including consistently arranging the workpieces with respect to the rotating cutterhead so that the dimension of each workpiece parallel with the axis of rotation of the cutterhead has a value W and the cutterhead being such that the spacing between the cutting blades being such that $W/[(\pi D(\cot \phi))/N]$ is an integer, in which D is the cutterhead diameter, N is the number of cutting blades and $\phi$ is the helix angle.

9 Claims, 4 Drawing Sheets

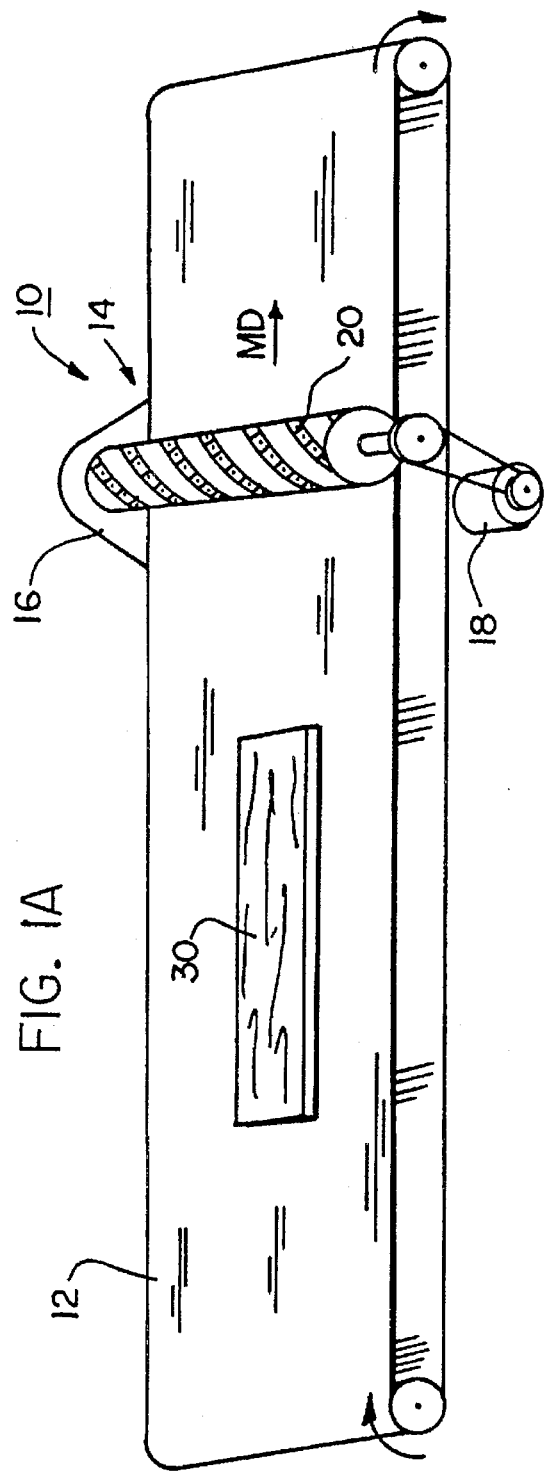
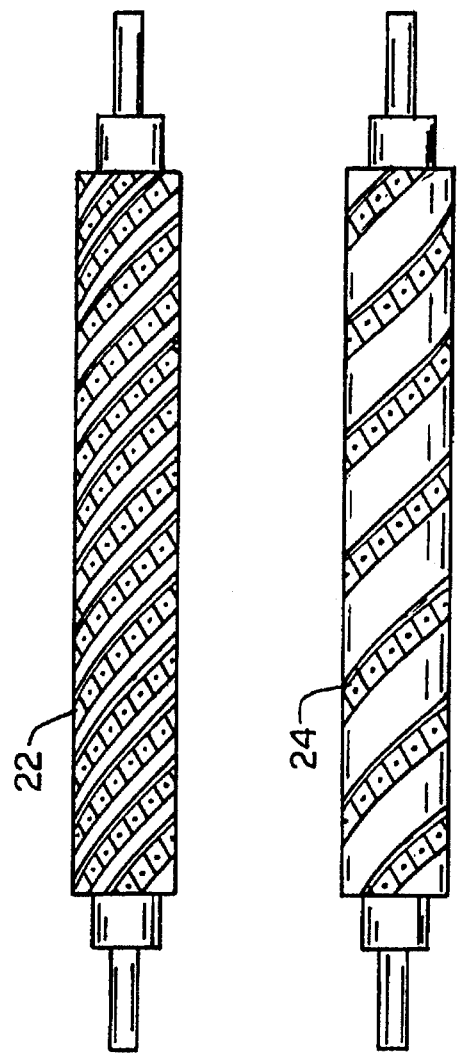

PLANING CUTTERHEAD GEOMETRY FOR OPTIMIZING WOOD SURFACING

BACKGROUND OF THE INVENTION

The present invention relates to an improvement on the wood planer cutterhead design for reduced noise level described in applicant's prior U.S. Pat. No. 4,074,737, the entire disclosure of which is incorporated herein by reference.

In the 1970's, workplace safety and health became a matter of concern. In the woodworking industry, the noise of machinery was excessive and applicant undertook extensive research to isolate and attempt to determine ways to reduce vibration and noise. As a result, the invention of the aforementioned '737 patent came about. Briefly, that patent covers an invention in which the design of a rotating helical cutterhead for a wood planer was devised. The cutterhead typically has more than one knife blade in contact with the workpiece at any instant by satisfying the minimum condition of the formula $L = \pi D \cot\phi/N$ is less than the workpiece width and in which L is the axial contact distance, D is the cutterhead diameter, N is the number of knife blades, $\phi$ is the helix angle, and L is preferably less than 4 inches.

Applying those design criteria to the manufacture of cutterheads successfully led to the reduction of noise in the planing workplace on a substantial basis.

Concerns in addition to noise abatement are also important, and applicant has found that further refinement of the relationship between the helical cutterhead design and the width of the workpiece being planed yield further advantages.

Those advantages are numerous.

The advantages are brought about by assuring that the width dimension of the lumber with respect to the contact distance of the cutterhead not only exceeds the cutterhead contact distance L, but is substantially equal to an integral multiple of the contact distance, whether the integer be 2, 3 or so on.

Making the workpiece width an integer has the effect of further reducing the fluctuating cutting forces and attendant vibration over and above the design described in the '737 patent. When the condition that the ratio of the workpiece's width to the cutterhead contact distance is an integer is met, there is minimal net change in fluctuating forces on the workpiece as a helical knife engages the workpiece, because at the same instant another helical knife disengages the workpiece. The reduction in vibration leads to numerous advantages.

First, the chips planed off of the surface of the workpiece are of excellent consistency and quality for chipboard manufacture.

Second, the surface quality in areas around knots is improved.

Third, the reduced cutting forces that occur when the width is an integral multiple of the contact distance lead to longer cutterhead tool life.

Fourth, since reduced vibrational forces are involved, sharper, more brittle tools can be used, increasing the length of the life of the blade required between sharpening.

Fifth, the finish on the surface of the workpiece is of a better and more uniform quality because there is less workpiece vibration.

Sixth, the reduced vibration leads to a longer bearing life for the mounting of the cutterhead on its arbor.

Seventh, with reduced cutting forces, less dense materials such as celotex may be cut.

Eighth, not only is the surface finish of the workpiece of better quality to the eye as unfinished, but after finishing, the quality is even further enhanced. The vibration caused by prior art methods seems to, by some mechanism similar to bruising, cause sub-surface damage. Upon staining of the workpiece, there is uneven stain uptake by the workpiece. By reducing the vibration through the implementation of the present invention, this uneven staining is reduced. Thus, numerous advantages are made possible by the present invention.

SUMMARY OF THE INVENTION

The present invention provides a planing apparatus having a helical cutterhead geometry for optimized planing of a variety of widths of workpieces on conventional woodworking machines. These machines comprise a frame having a machining area and a carrier or feed mechanism associated with the frame adapted to transport workpieces longitudinally through the machining area. In a typical configuration, the machining area includes an arbor assembly and a drive mechanism to rotate the arbor assembly. A plurality of planing cutterheads are interchangeably mountable on the arbor assembly, each designed to plane a particular width of workpiece carried through the machining area on the feedworks. Alternatively, the cutterhead and arbor can be integrated into a single, one piece unit. Each cutterhead includes a series of helically mounted cutting blades mounted on the cutterhead, the cutting blades being spaced circumferentially on the cutterhead. The width of the workpiece and spacing between the cutting blades on the cutterhead is such that $W/L = W/[(\pi D \cot \phi)/N]$ is an integer, in which L is the axial distance between adjacent helical cutting blades, D is the cutterhead diameter, N is the number of cutting blades, $\phi$ is the helix angle, and W is the width of the workpiece. Therefore, an integral number of cutting blades simultaneously engage a surface of the workpiece to be planed on the feedworks. As used hereinafter, the phrase "cutting blades simultaneously engage a surface of the workpiece to be planed" means that one cutting blade engages the workpiece simultaneously as another cutting blade disengages the workpiece.

In one embodiment, the plurality of planing cutterheads includes at least three of the interchangeable planing cutterheads, each having a different value of L. Preferably, one of the cutterheads has a value of L equal to 1.875 inches. This L value provides for optimal planing of conventional construction lumber having widths of 3.750, 5.625, 7.500, and 9.375 inches. These dimensions correspond closely to standardized lumber widths prior to planing (i.e. 2×4, 2×6, 2×8, 2×10, etc.). The plurality of planing cutterheads also preferably includes planing cutterheads having L's equal to 2 inches, 3 inches, and 5 inches. It should be understood, however, that the plurality of planing cutterheads may include other values of L, including metric values, as required for particular workpieces.

The invention also provides an apparatus for planing a variety of widths of workpieces including a frame having a machining area and a feedworks associated with the frame adapted to transport the workpieces in a machine direction through the machining area. The machining area includes an arbor assembly and a drive mechanism to rotate a planing cutterhead mounted on the arbor assembly, and an adjustable mounting between the arbor assembly and the feedworks to permit the angle $\theta$ of the axis of the planing cutterhead with respect to the machine direction to be adjusted for a particular workpiece of a width W. The planing cutterhead is mounted on the arbor assembly to plane workpieces of a width W carried through the machining area by the feedworks, including a series of helically mounted cutting blades mounted on the cutterhead, the cutting blades being spaced circumferentially on the cutterhead and positioned to simultaneously engage a surface of the workpiece to be planed on the feedworks. The spacing between the cutting blades and the angle $\theta$ of mounting the arbor assembly with respect to the machine direction is such that $(W/\cos \theta)/[(\pi D(\cot \phi))/N]$ is an integer, in which D is the cutterhead diameter, N is the number of cutting blades and $\phi$ is the helix angle. Therefore, one cutting blade engages the workpiece at substantially the same moment another cutting blade disengages the workpiece.

The invention also provides a method of planing a variety of widths of workpieces including transporting a first series of workpieces of a width W longitudinally through a machining area having a rotating cutterhead that includes a series of helically mounted cutting blades spaced circumferentially on the cutterhead and positioned to simultaneously engage a surface of the workpiece. The spacing between the cutting blades is such that $W/L=W/[(\pi D \cot \phi)/N]$ is an integer, in which L is the axial distance between adjacent helical cutting blades, D is the cutterhead diameter, N is the number of cutting blades, $\phi$ is the helix angle, and W is the width of the workpieces in the first series. Therefore, one cutting blade engages the workpiece at substantially the same moment another cutting blade disengages the workpiece. The method proceeds by changing the cutterhead in the machining area to an second cutterhead for a second series of workpieces of width W', in which the second cutterhead includes a series of helically mounted cutting blades spaced circumferentially on the cutterhead and positioned to simultaneously engage a surface of the workpiece, the spacing between the cutting blades being such that $W'/L'=W'/(\pi D' \cot \phi')/N'$ is an integer, in which L' is the linear distance between adjacent helical cutting blades, D' is the cutterhead diameter, N' is the number of cutting blades, $\phi'$ is the helix angle, and W' is the width of the workpieces in the second series. The method continues by transporting the second series of workpieces through the machining area.

The method may include changing the cutterhead to a third cutter head for a third series of workpieces of width W", in which the third cutterhead includes a series of helically mounted cutting blades spaced circumferentially on the cutterhead and positioned to simultaneously engage a surface of the workpiece, the spacing between the cutting blades being such that $W"/L"=W"/[(\pi D" \cot \phi")/N"]$ is an integer, in which L" is the axial distance between adjacent helical cutting blades of the third cutterhead, D" is the third cutterhead's diameter, N" is the number of cutting blades on the third cutterhead, $\phi"$ is the helix angle of the third cutterhead, and W" is the width of the workpieces in the third series. Therefore, one cutting blade engages the workpiece at substantially the same moment another cutting blade disengages the workpiece. The method continues by transporting the third series of workpieces through the machining area.

The invention further provides a method of planing a variety of widths of workpieces including transporting a first series of workpieces of a width W in a machine direction through a machining area having a rotating cutterhead that has an axis oriented at an angle $\theta$ with respect to the machine direction and that includes a series of helically mounted cutting blades spaced circumferentially on the cutterhead and that is positioned to simultaneously engage a surface of the workpiece. In other words, one cutting blade engages the workpiece at substantially the same moment another cutting blade disengages the workpiece. The angle $\theta$ and the spacing between the cutting blades is such that $(W/\cos \theta)/[(\pi D (\cot \phi))/N]$ is an integer, in which D is the cutterhead diameter, N is the number of cutting blades and $\phi$ is the helix angle. The method proceeds by changing the angle of the cutterhead with respect to the machine direction to an angle $\theta'$ for a second series of workpieces of width W', the angle $\theta'$ being such that $(W'/\cos \theta')/[(\pi D(\cot \phi))/N]$ is an integer, and transporting the second series of workpieces through the machining area.

The invention further provides a method of planing a variety of widths of workpieces including transporting workpieces through a machining area having a rotating cutterhead that includes a series of helically mounted cutting blades spaced circumferentially on the cutterhead and that is positioned to simultaneously engage a surface of the workpiece. Therefore, one cutting blade engages the workpiece at substantially the same moment another cutting blade disengages the workpiece. The transporting step includes consistently arranging the workpieces with respect to the rotating cutterhead so that the dimension of each workpiece parallel with the axis of rotation of the cutterhead has a value W and the cutterhead being such that the spacing between the cutting blades being such that $W/[(\pi D(\cot \phi))/N]$ is an integer, in which D is the cutterhead diameter, N is the number of cutting blades and $\phi$ is the helix angle.

BRIEF DESCRIPTION OF THE DRAWINGS

The invention will be better understood after a reading of the Detailed Description of the Preferred Embodiments and a review of the drawings in which:

FIG. 1 is a schematic view of a planing machine provided with multiple cutterheads according to one embodiment of the invention;

DETAILED DESCRIPTION OF THE PREFERRED EMBODIMENTS

Figure 2:
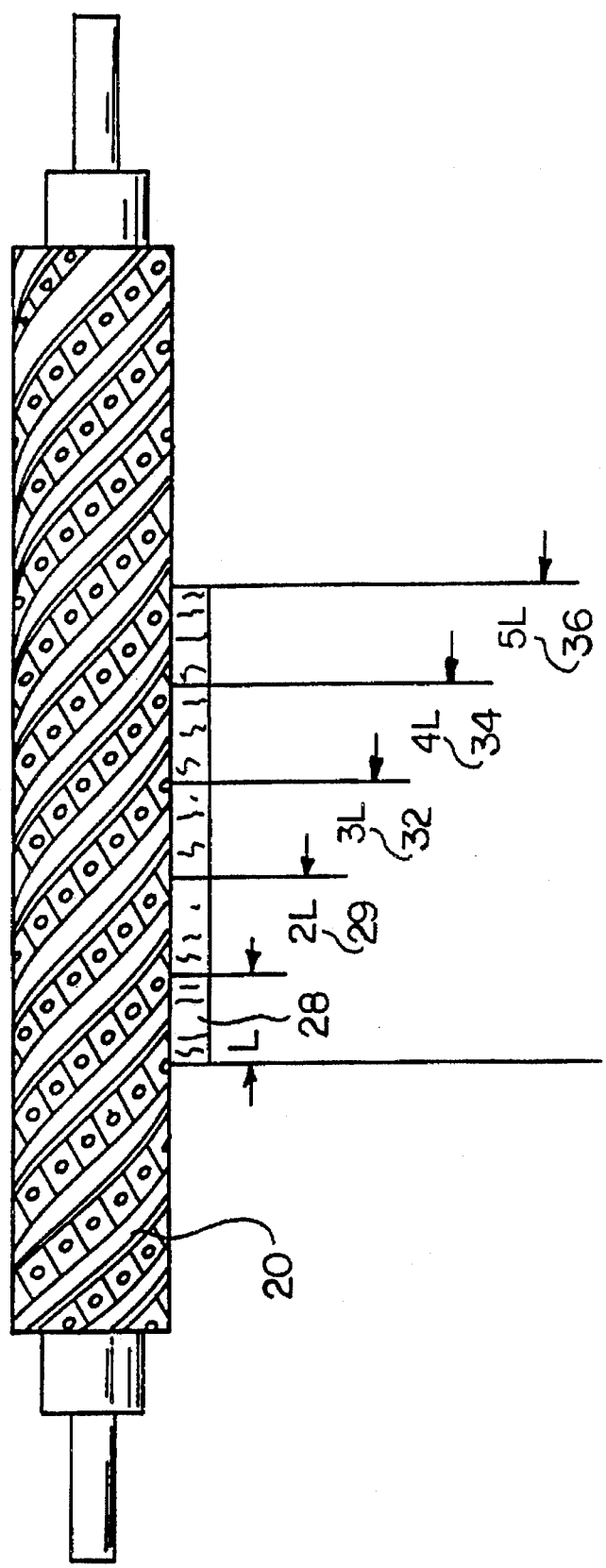
FIG. 2 is a diagram helpful in understanding the geometry of the embodiment of FIG. 1.

The provision of a helical cutterhead having an axial contact distance L, such that the ratio of the width W of the workpiece to the axial contact distance L is an integer, of course, requires accommodating the cutterhead to varying widths of workpieces. As long as the integral relationship is met, any of the various methods and apparatuses can be used to meet the design criteria of the invention.

For example, the apparatus shown schematically in FIG. 1 can be used with more conventional planing apparatuses. The apparatus 10 includes a conventional feedworks 12 which carries a workpiece 30 through a machining area 14. The machining area 14 includes an arbor assembly 16 in which the cutterhead 20 is mounted. A drive mechanism 18 is connected to the arbor assembly 16 to provide rotational drive to the cutterhead 20. In the conventional planing apparatus, the workpiece 30 is transported by the feedworks 12 in a machine direction MD such that the longitudinal dimension of the workpiece 30 is substantially parallel with the machine direction and substantially perpendicular to the rotational axis of the cutterhead 20.

For a cutterhead 20 as shown in the figure having a particular contact distance L, that cutterhead 20 can be used to cut any workpiece 30 having a width W that is an integral multiple of the dimension L. For example, as seen in FIG. 2, the cutterhead 20 is seen to have a contact distance L and therefore is suitable for planing a workpiece 28 having a width equal to L. That same cutterhead 20 can also be used to cut the workpieces 29,32,34,36 having their respective widths of 2L,3L,4L,5L. Of course, any other workpiece having a width which is equal to an integral multiple of L up to the working width of the cutterhead 20 can be optimally planed by that cutterhead 20.

However, for a typical woodworking operation, the workpiece to be cut will not always be of a width that is an integral multiple of the contact distance of the cutterhead. For that reason, alternate cutterheads 22,24 are provided as shown in FIGS. 1b and 1c having different helical pitches or leads, and therefore different contact distances L. Each cutterhead 22,24 can be designed so as to have a contact distance L so that the widths W of the workpieces expected to be planed at that facility will be an integral multiple of L. Then, when it is time to change from a series of workpieces having a width that is an integral multiple of the L of cutterhead 20 to a workpiece having a width that is an integral multiple of the L of cutterhead 22, cutterhead 20 is replaced by cutterhead 22. Then the new workpieces can be processed and maintain the relationship of the width of the workpiece to value L as an integral multiple.

For example, the cutter heads 20,22,24 may have contact distances of integral numbers of inches such as 2, 3 and 5 inches respectively, and thereby permit the planing of workpieces having widths of 2, 3, 4, 5, 8, 9, 10, 12, 14, 15, 16, 18 and 20 inches, for example. Preferably, one of the cutterheads has a value of L equal to 1.875 inches to provide for optimal planing of conventional construction lumber having widths of 3.750, 5.625, 7.500, and 9.375 inches. Other dimensions for the expected workpiece widths can, of course, be used, including metric multiples.

Figure 3:
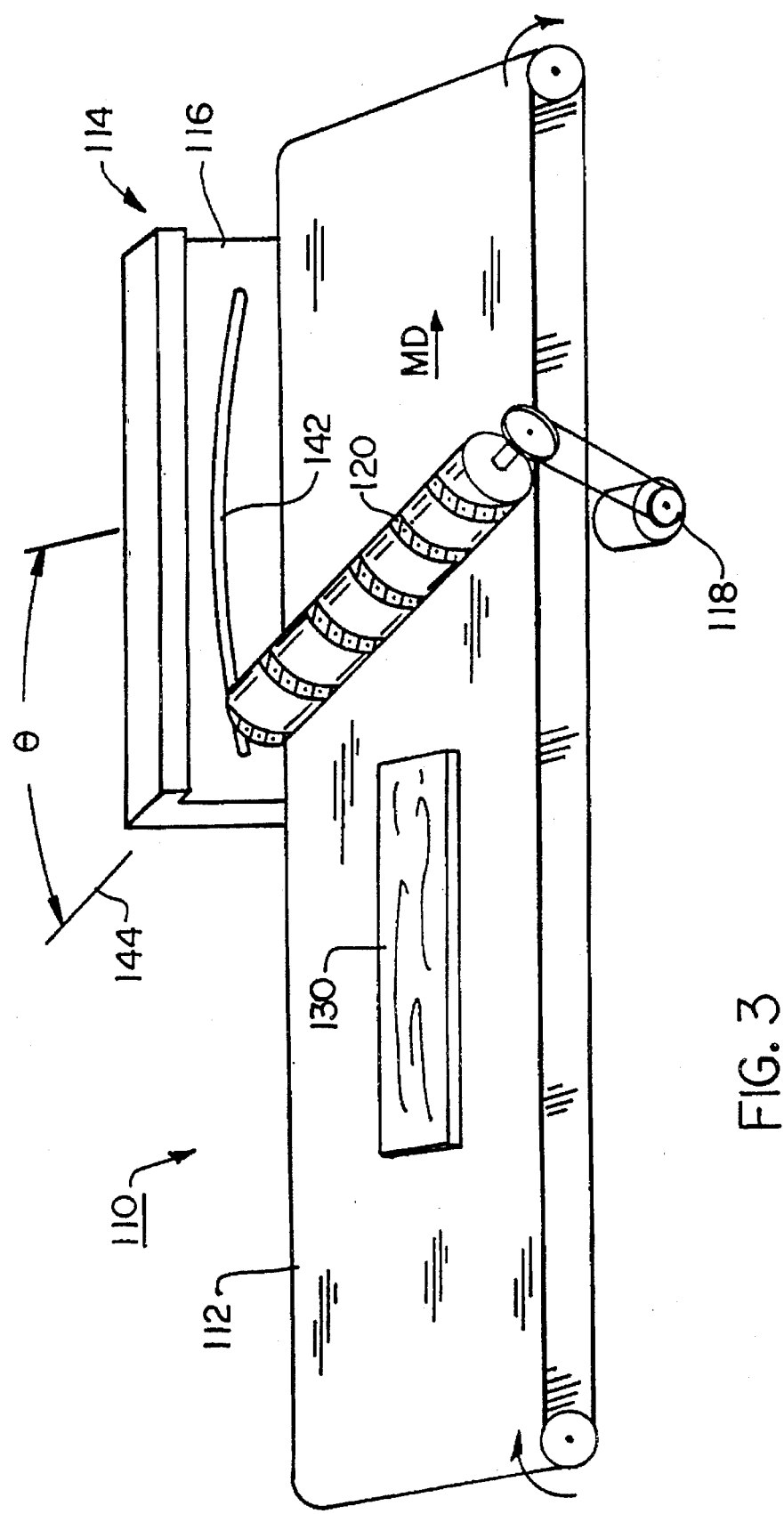
FIG. 3 is a schematic view of a planing machine equipped with an adjustable cutterhead according to another embodiment of the invention.

FIG. 3 shows an alternate embodiment of a planing apparatus 110 suitable for carrying out the invention. A feedworks 112 carries the workpiece 130 through a machining area 114 made up of an arbor assembly 116 and a drive mechanism 118. Arbor assembly 116 supports a cutterhead 120 for rotation by the drive mechanism 118. However, in this apparatus, the cutterhead 120 has one end pivotal in a pivotal mount 140, and the other end traversable through an arcuate mount 142. Thus, the axis of rotation 144 of the cutterhead 120 can be caused to be varied to be perpendicular or other than perpendicular to the machine direction MD. The angle between the axis of rotation 144 and the machine direction is θ.

Figure 4:
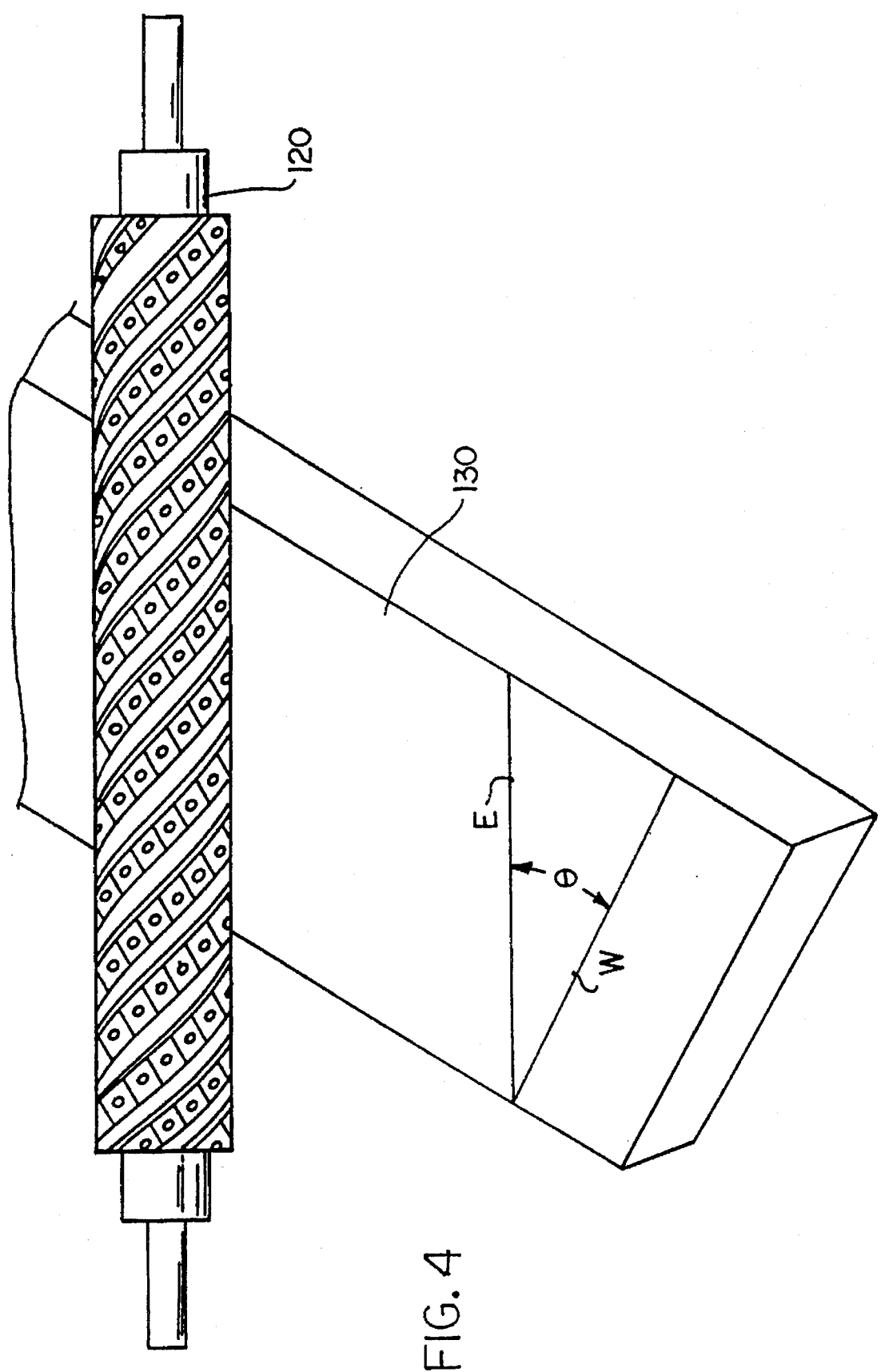
FIG. 4 is a diagram helpful in understanding the geometry of the embodiment of FIG. 3.

As seen in FIG. 4, the approach of the workpiece 130 to the cutterhead 120 at the angle θ transforms the dimension that is in contact with the cutterhead 120 from being the width W of the workpiece 130 to a variable E (for effective width) which is equal to W÷cos θ. Thus, in order for E to be equal to an integral multiple of L for a workpiece with W, the axis of rotation of the cutterhead 120 should be set at an angle such that W÷cos θ equals an integral multiple of L. Preferably, θ has a value of less than thirty degrees. Set forth below is a table outlining various values for W, L, θ and E for various possible setups.

Of course, an alternate way to achieve the result of using the effective width E to be equal a integral multiple of L is to maintain the cutterhead 120 perpendicular to the machine direction and present the workpieces at an acute angle to the machine direction.

| W | L | W/L | θ | E = W/cos (θ) | E/L |
|---|---|-----|---|---------------|-----|
| 4 | 1 | 4 | 0 | 4 | 4 |
| 6 | 1 | 6 | 0 | 6 | 6 |
| 8 | 1 | 8 | 0 | 8 | 8 |
| 10 | 1 | 10 | 0 | 10 | 10 |
| 12 | 1 | 12 | 0 | 12 | 12 |
| 14 | 1 | 14 | 0 | 14 | 14 |
| 16 | 1 | 16 | 0 | 16 | 16 |
| 18 | 1 | 18 | 0 | 18 | 18 |
| 4 | 2 | 2 | 0 | 4 | 2 |
| 6 | 2 | 3 | 0 | 6 | 3 |
| 8 | 2 | 4 | 0 | 8 | 4 |
| 10 | 2 | 5 | 0 | 10 | 5 |
| 12 | 2 | 6 | 0 | 12 | 6 |
| 14 | 2 | 7 | 0 | 14 | 7 |
| 16 | 2 | 8 | 0 | 16 | 8 |
| 4 | 3 | 1.33 | 48.18 | 6 | 2 |
| 6 | 3 | 2 | 0 | 6 | 2 |
| 8 | 3 | 2.66 | 27.26 | 9 | 3 |
| 10 | 3 | 3.33 | 33.55 | 12 | 4 |
| 12 | 3 | 4 | 0 | 12 | 4 |
| 14 | 3 | 4.67 | 21.04 | 15 | 5 |
| 16 | 3 | 5.33 | 27.26 | 18 | 6 |
| 4 | 4 | 1 | 0 | 4 | 1 |
| 6 | 4 | 1.5 | 41.41 | 8 | 2 |
| 8 | 4 | 2 | 0 | 8 | 2 |
| 10 | 4 | 2.5 | 33.55 | 12 | 3 |
| 12 | 4 | 3 | 0 | 12 | 3 |
| 14 | 4 | 3.5 | 28.95 | 16 | 4 |
| 16 | 4 | 4 | 0 | 16 | 4 |

Those of ordinary skill in the art may realize there are other ways of carrying out the invention to achieve the integral relationship between the width of the workpiece and the value L other than those specifically outlined herein. Those are deemed to be within the scope of this invention. Furthermore, although a precise integer is a preferred form of the invention, slight variations from an integer as the ratio of W/L may occur to cause the workpiece to address the cutterhead to achieve a substantially integral relationship between W (or E) and L.

I claim:

1. An apparatus for planing a variety of widths of workpieces comprising a frame having a machining area, a feedworks associated with said frame adapted to transport workpieces longitudinally through said machining area, said machining area including an arbor assembly and a drive mechanism to rotate said arbor assembly, and a plurality of planing cutterheads interchangeably mountable in said arbor assembly to plane a particular width of workpiece carried through said machining area by said feedworks, each said cutterhead including a series of helically mounted cutting blades mounted on said cutterhead, said cutting blades being spaced circumferentially on said cutterhead and positioned such that one cutting blade engages the workpiece simultaneously as another cutting blade disengages the workpiece, the spacing between said cutting blades being such that $W/L = W/[(\pi D \cot \phi)/N]$ is an integer, in which L is the axial distance between adjacent helical cutting blades, D is the cutterhead diameter, N is the number of cutting blades and φ is the helix angle, and W is the width of the workpiece.

2. An apparatus as claimed in claim 1 wherein said plurality of planing cutterheads includes at least three of said planing cutterheads.

3. An apparatus as claimed in claim 1 wherein said plurality of planing cutterheads includes planing cutterheads having L's equal to integral numbers of inches.

4. An apparatus as claimed in claim 1 wherein said plurality of planing cutterheads includes a planing cutterhead having L equal to 1.875 inches.

5. An apparatus for planing a variety of widths of workpieces comprising a frame having a machining area, a feedworks associated with said frame adapted to transport the workpieces in a machine direction through said machining area, said machining area including an arbor assembly and a drive mechanism to rotate a planing cutterhead mounted in said arbor assembly, and an adjustable mounting between said arbor assembly and said feedworks to permit the angle θ of the axis of said planing cutterhead with respect to said machine direction to be adjusted for a particular workpiece width W, said planing cutterhead mounted in said arbor assembly to plane workpieces of a width W carried through said machining area on said feedworks, including a series of helically mounted cutting blades mounted on said cutterhead, said cutting blades being spaced circumferentially on said cutterhead and positioned such that one cutting blade engages the workpiece simultaneously as another cutting blade disengages the workpiece, the spacing between said cutting blades and the angle θ of mounting said arbor assembly with respect to said machine direction being such that (W/cos θ)/[(π D (cot φ))/N] is an integer, in which D is the cutterhead diameter, N is the number of cutting blades, φ is the helix angle, and θ is the workpiece angle.

6. A method of planing a variety of widths of workpieces comprising transporting a first series of workpieces of a width W longitudinally through a machining area having a rotating cutterhead that includes a series of helically mounted cutting blades spaced circumferentially on the cutterhead and positioned such that one cutting blade engages the workpiece simultaneously as another cutting blade disengages the workpiece, the spacing between the cutting blades being such that W/L=W/[(π D cot φ)/N] is an integer, in which L is the axial distance between adjacent helical cutting blades, D is the cutterhead diameter, N is the number of cutting blades, φ is the helix angle, and W is the width of the workpieces in the first series, changing the cutterhead in the machining area to an second cutterhead for a second series of workpieces of width W', in which the second cutterhead includes a series of helically mounted cutting blades spaced circumferentially on the cutterhead and positioned such that one cutting blade engages the workpiece simultaneously as another cutting blade disengages the workpiece, the spacing between the cutting blades being such that W'/L'=W'/[(π D' cot φ')/N'] is an integer, in which L' is the axial distance between adjacent helical cutting blades, D' is the cutterhead diameter, N' is the number of cutting blades, φ' is the helix angle, and W' is the width of the workpieces in the second series, and transporting the second series of workpieces through the machining area.

7. A method as claimed in claim 1 further comprising changing the cutterhead to a third cutter head for a third series of workpieces of width W", in which the third cutterhead includes a series of helically mounted cutting blades spaced circumferentially on the cutterhead and positioned such that one cutting blade engages the workpiece simultaneously as another cutting blade disengages the workpiece, the spacing between the cutting blades being such that W"/L"=W"/(π D" cot φ")/N" is an integer, in which L" is the axial distance between adjacent helical cutting blades of the third cutterhead, D" is the third cutterhead's diameter, N" is the number of cutting blades on the third cutterhead, φ" is the helix angle of the third cutterhead, and W" is the width of the workpieces in the third series, and transporting the third series of workpieces through the machining area.

8. A method of planing a variety of widths of workpieces comprising transporting a first series of workpieces of a width W in a machine direction through a machining area having a rotating cutterhead that is oriented at an angle θ with respect to the machine direction and that includes a series of helically mounted cutting blades spaced circumferentially on the cutterhead and positioned such that one cutting blade engages the workpiece simultaneously as another cutting blade disengages the workpiece, the angle θ and the spacing between the cutting blades being such that (W/cos θ)/[(π D (cot φ))/N] is an integer, in which D is the cutterhead diameter, N is the number of cutting blades, φ is the helix angle, and θ is the workpiece angle; and changing the angle of the cutterhead with respect to the machine direction to an angle θ' for a second series of workpieces of width W', the angle θ' being such that (W'/cos θ')/[(π D (cot φ))/N] is an integer, and transporting the second series of workpieces through the machining area.

9. A method of planing a variety of widths of workpieces comprising transporting workpieces through a machining area having a rotating cutterhead that includes a series of helically mounted cutting blades spaced circumferentially on the cutterhead and positioned such that one cutting blade engages the workpiece simultaneously as another cutting blade disengages the workpiece, said transporting step including consistently arranging the workpieces with respect to the rotating cutterhead so that the dimension of each workpiece parallel with the axis of rotation of the cutterhead has a value W and the cutterhead being such that the spacing between the cutting blades being such that W/[(π D(cot φ))/N] is an integer, in which D is the cutterhead diameter, N is the number of cutting blades and φ is the helix angle.

* * * * *

UNITED STATES PATENT AND TRADEMARK OFFICE
CERTIFICATE OF CORRECTION

PATENT NO. : 5,653,275
DATED : August 5, 1997
INVENTOR(S) : John S. Stewart

It is certified that error appears in the above-indentified patent and that said Letters Patent is hereby corrected as shown below:

In Claim 7, Line 1, Change Claim 1 to Claim 6.

Signed and Sealed this

Ninth Day of December, 1997

Attest:

BRUCE LEHMAN

Attesting Officer

Commissioner of Patents and Trademarks